United States Patent

Cullen et al.

[11] Patent Number: 5,781,665
[45] Date of Patent: Jul. 14, 1998

[54] APPARATUS AND METHOD FOR CROPPING AN IMAGE

[75] Inventors: Mark F. Cullen, Bethany, Conn.; Mayur N. Patel, Los Angeles, Calif.

[73] Assignee: Pitney Bowes Inc., Stamford, Conn.

[21] Appl. No.: 519,903

[22] Filed: Aug. 28, 1995

[51] Int. Cl.$^6$ .............................. G06K 9/00; G06K 9/34; G06K 9/38; G06K 9/40
[52] U.S. Cl. .................. 382/254; 348/268; 358/445; 380/23; 382/115; 382/118; 382/171; 382/173; 382/174; 382/266; 382/271; 382/282; 382/286; 382/291; 395/761
[58] Field of Search ........................... 382/171, 173, 382/254, 266, 271, 115, 118, 174, 282, 286, 291; 348/268; 358/445; 380/23; 395/761

[56] References Cited

U.S. PATENT DOCUMENTS

| | | | |
|---|---|---|---|
| 5,159,667 | 10/1992 | Borrey et al. | 395/761 |
| 5,315,393 | 5/1994 | Mican | 348/268 |
| 5,343,283 | 8/1994 | Van Dorsselaer et al. | 358/445 |
| 5,420,924 | 5/1995 | Berson et al. | 380/23 |
| 5,481,622 | 1/1996 | Gerhardt et al. | 382/171 |

*Primary Examiner*—Leo H. Boudreau
*Assistant Examiner*—Daniel G. Mariam
*Attorney, Agent, or Firm*—Robert H. Whisker; Melvin J. Scolnick; Robert Meyer

[57] ABSTRACT

A method and apparatus for cropping an image in digital form. The image to be cropped is represented as a first digital array which is operated on by an edge enhancement transformation to generate a second, binary digital array wherein edges of the image are emphasized. The second digital array is then partitioned into predetermined segments which are typically rows and columns of the array and the pixel values of each row and column are summed to generate brightness sums. The second digital array is then partitioned into a first, brighter, central group of rows and a second, less bright group consisting of upper and lower borders of rows; and a third, brighter, central group of column and left and right borders of columns in accordance with predetermined criteria relating to the brightness sums. The boundaries between the borders and the central groups are then applied to the first digital array and only those pixel values corresponding to pixel values common to the first and third groups are output to generate a cropped image.

16 Claims, 6 Drawing Sheets

APPARATUS AND METHOD FOR CROPPING AN IMAGE

BACKGROUND OF THE INVENTION

The subject invention relates to an apparatus and method for cropping an image to remove portions of the image which contain relatively little detail (i.e. have a low information content). More particularly it relates to a method and apparatus for cropping an image of a person's face.

U.S. Pat. No. 5,420,924; to: Berson et. al; issued: May 30, 1995 discloses an identification card which includes an image of a person to be identified together with an encrypted digital representation of that image. Such a card can be verified by decrypting the digital representation and displaying it for comparison with the image on the card. Preferably the digital representation is stored on the card in the form of a two dimensional barcode. In order to reduce the amount of area on the card consumed by the barcode needed, it would be very desirable to crop the image to eliminate as much of the image background as possible.

Other applications where it would be desirable to crop an image will be readily apparent to those skilled in the art.

Thus, it is an object of the subject invention to provide a method for automatically cropping an image.

One known method of producing such cropped images is to have a skilled operator manually crop an image by physically cutting away portions of a photographic image, or by electronically manipulate a digital array representing the image through a computer system. Another method would be to have a skilled technician initially create a closely focused image which contains minimal amounts of background. These approaches, however, require high degrees of judgment and care which could prove to be unduly expensive for applications where large numbers of identification cards must be produced, as where the identification card also serves as a drivers license.

BRIEF SUMMARY OF THE INVENTION

The above object is achieved and the disadvantages of the prior art are overcome in accordance with the subject invention by means of an apparatus and method for cropping an image which is represented as a digital array of pixel values. The digital array is first processed to produce a second digital array which corresponds to a transformation of the image to enhance edges in the image. (i.e. The boundaries between areas of uniform or gradually changing intensity are emphasized while variations within such areas are de-emphasized.) The second digital array is then partitioned into predetermined segments and the pixel values for each segment are summed to obtain a brightness sum for each of the segments. The segments are then divided into a first, higher brightness group and a second, lower brightness group in accordance with predetermined criteria relating to the brightness sums. A group of the first digital array which corresponds to the first group of the second digital array is then identified and at least part of the group of the first digital array is then output to generate a cropped image.

In accordance with one aspect of the subject invention a threshold is applied to each value output by the edge enhancement transformation so that the second digital array is an array of binary pixel values.

In accordance with another aspect of the subject invention the edge enhancement transformation includes applying a non-linear edge enhancement filter to the first digital array and the applied threshold is selected as a function of the background portion of the image.

In accordance with still another aspect of the subject invention the edge enhancement transformation includes applying a linear edge enhancement filter to the first digital array and then applying a noise filter to output of the linear edge enhancement filter.

In accordance with still another aspect of the subject invention the segments are horizontal rows of the second digital array and the first group of segments is a continuous group of rows which contain a predetermined fraction of the total brightness of the second digital array.

In accordance with still yet another aspect of the subject invention the segments are horizontal rows (or vertical columns) of the second digital array and the second group of segments is a predetermined number of the rows (or columns) divided into two contiguous outboard subgroups of the rows (or columns), the subgroups having equal brightness.

Since the density of detail (i.e. information content) of an image closely correlates to the density of edges in that image, those skilled in the art will readily recognize that the above summarized invention clearly achieves the above object and overcomes the disadvantages of the prior art. Other objects and advantages of the subject invention will be apparent to those skilled in the art from consideration of the attached drawings and the detailed description set forth below.

BRIEF DESCRIPTION OF THE DRAWINGS

Various preferred embodiments of the subject invention are shown in the following figures wherein substantially identical elements shown in various figures are numbered the same.

DETAILED DESCRIPTION OF PREFERRED EMBODIMENTS OF THE SUBJECT INVENTION

Figure 1:
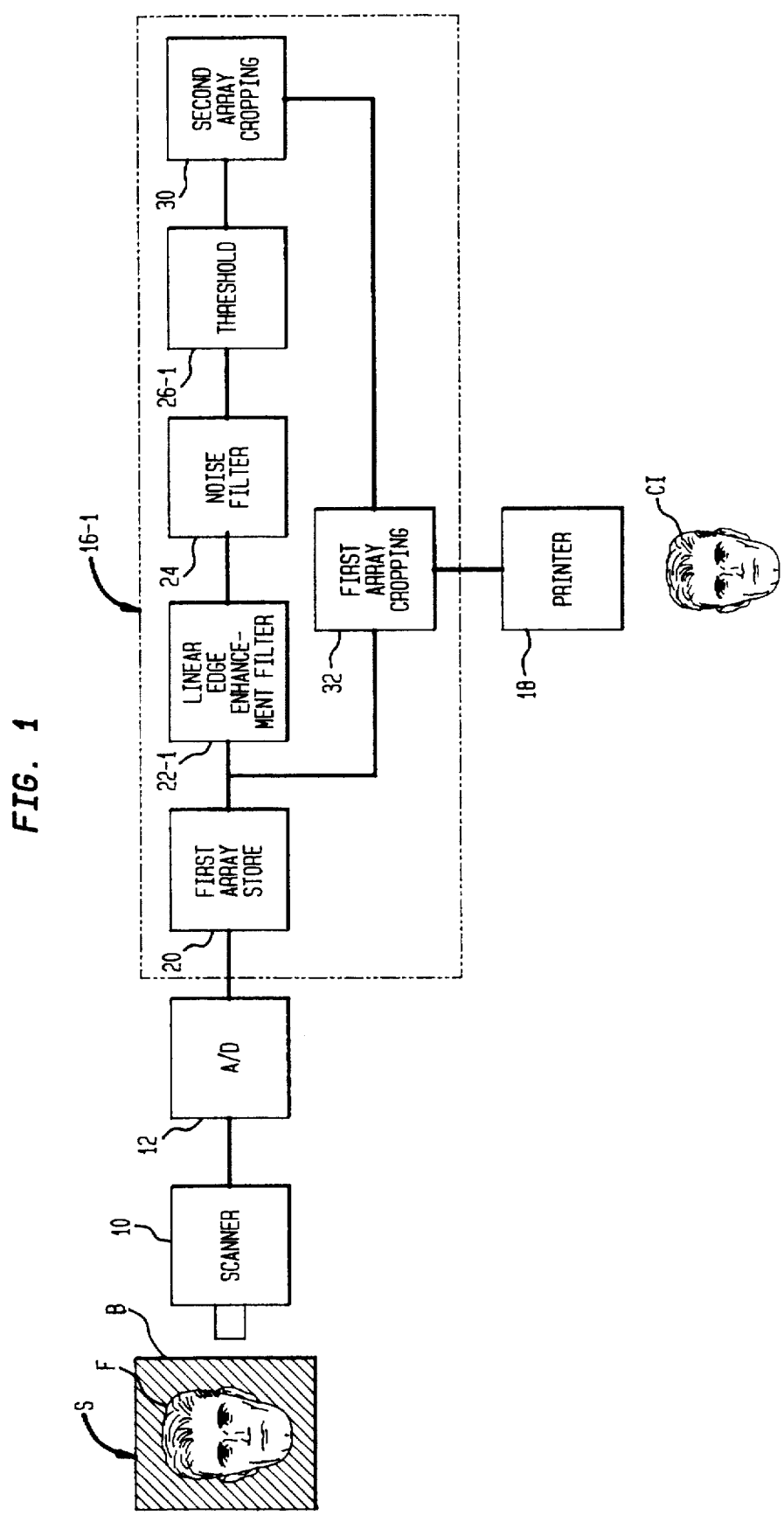
FIG. 1 shows a schematic block diagram of a preferred embodiment of the subject invention.
Figure 2:
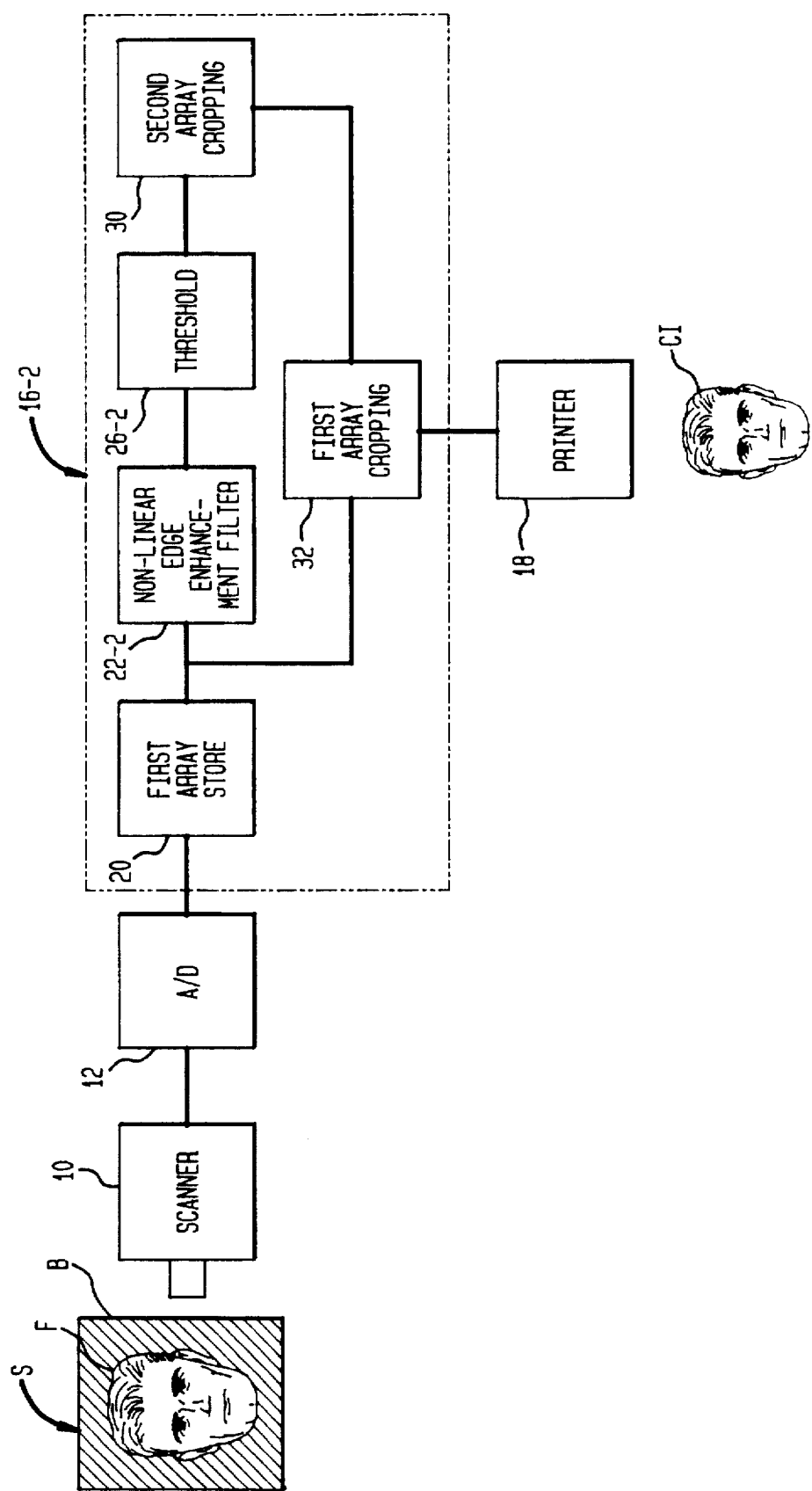
FIG. 2 shows a schematic block diagram of a second preferred embodiment of the subject invention.

Turning to FIGS. 1 and 2, two preferred embodiments of the subject invention are shown. In each of these embodiments a subject S is scanned by conventional scanner 10 whose output is converted to digital values by conventional A/D converter 12. Preferably subject S consist of face F of a person to be identified by an identification card and background B, which is preferably a uniform, substantially featureless screen or the like.

The output of A/D converter 12 is stored in first array store 20 which is comprised in both cropping apparatus 16-1 and 16-2. Store 20 stores a first array of pixel values, which are preferably greyscale values. Apparatus 16-1 and 16-2 process the first array to provide an output to printer 18 (or other suitable output device) to provide cropped image CI, as will be described further below.

Turning to FIG. 1 the output of store 20 is transformed by linear edge enhancement filter 22-1, noise filter 24 and threshold 26-1 to generate a second digital array of binary pixel values corresponding to an image of subject S having its edges enhanced.

The second digital array is then cropped by second array cropping element 30, which sums the pixel values for each of a plurality of predetermined segments into which the second digital array have been partitioned to obtain a brightness sum for each of the segments. These segments are divided into at least a first group having a relatively higher total brightness and a second group having a relatively lower total brightness. The boundaries between the first and second groups of the second digital array are then applied to the first digital array by first array cropping apparatus 32 to identify a group of the first digital array which corresponds to the first group of the second digital array. The identified group of the first array is then output to printer 18 to produce cropped image CI.

In a preferred embodiment element 30 may further crop the second digital array by partitioning the second digital array into a set of segments which are then divided into a third relatively bright and forth relatively less bright groups and element 32 outputs only those pixel values of the first digital array which correspond to values of the second digital array common to the first and third groups, as will be described further below.

Linear edge enhancement filter 22-1 begins the transformation of the first digital array by successively convolving the first digital array with each of four 3×3 masks shown in Table I below. The results of these four convolution operations are then summed to provide an output.

(The functioning of such edge enhancement filters, and of the nonlinear filter which will be described with respect to FIG. 2 are well known in the art and need not be discussed further here for an understanding of the subject invention.)

and appropriately selecting threshold 26-2 apparatus 16-2 eliminates the need for a noise filter.

TABLE II

| mask1 | mask2 |
|---|---|
| $\begin{bmatrix} -1 & 0 & 1 \\ -2 & 0 & 2 \\ -1 & 0 & 1 \end{bmatrix}$ | $\begin{bmatrix} 1 & 2 & 1 \\ 0 & 0 & 0 \\ -1 & -2 & -1 \end{bmatrix}$ |

Determination of the proper threshold value to use in apparatus 16-2 is a function of background B. For a given background color, lighting conditions, and camera position and parameters, threshold 26-2 may be calibrated by repeatedly generating a second digital image of background B only; i.e. without a foreground subject, and adjusting threshold 26-2 to minimize the number of asserted noise pixels. This calibration process can readily be automated by a person skilled in the art. Where background B is known threshold 26-2 may be preset; or, where background B may vary threshold 26-2 can be calibrated in the field.

Preferably apparatus 16-1 and 16-2 are implemented by programming a general purpose digital computer to carry out the various functions illustrated. Programming of such a computer to implement appropriate sub-routines to carry out the illustrated functions would be a routine matter for a person of ordinary skill in the art and need not be discussed further here for an understanding of the subject invention.

Figure 3:
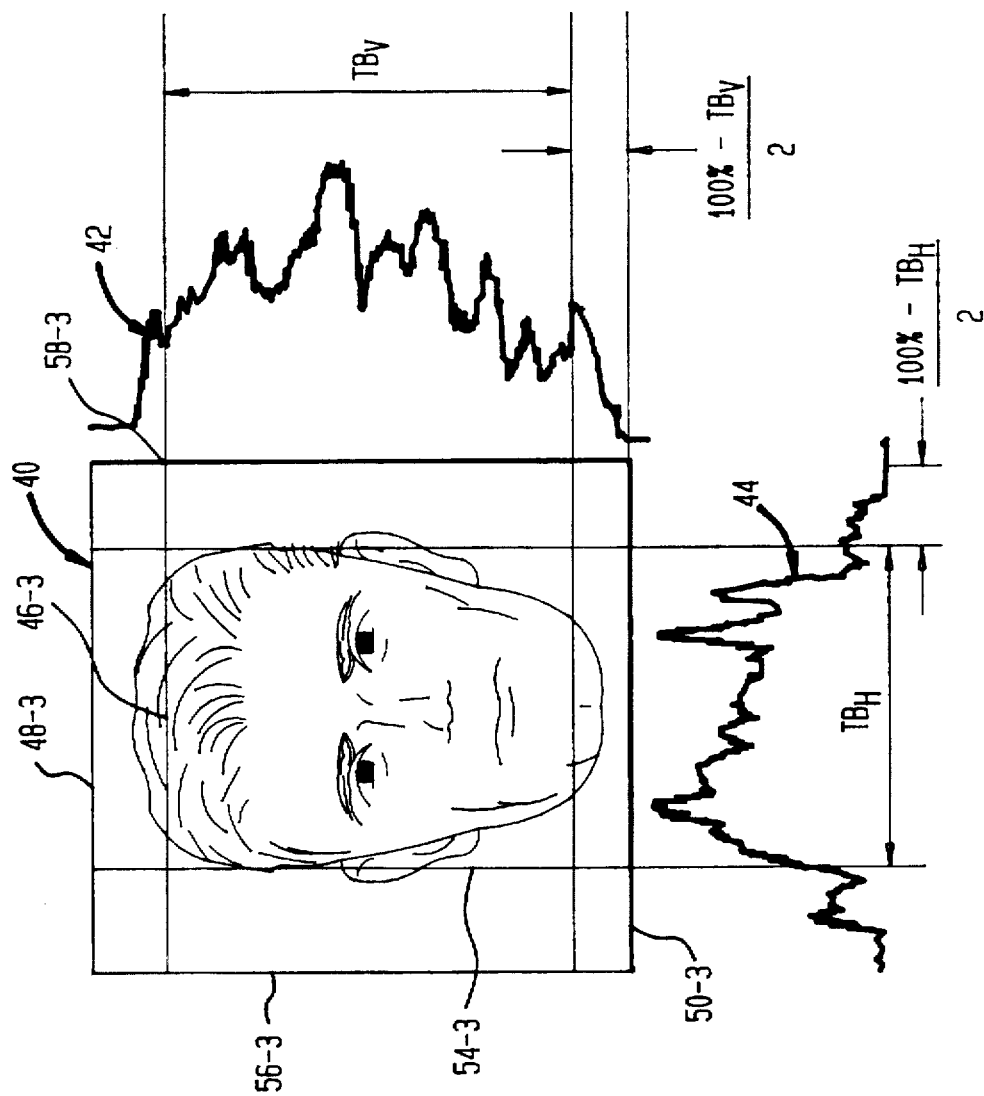
FIG. 3 is an illustration of one method of cropping an image in accordance's with the subject invention.

FIG. 3 is an illustration of one manner in which second array cropping element 30 can operate. Image 40 is a line drawing representation corresponding to the second digital array and showing an edged enhanced image of subject S. By emphasizing edges and de-emphasizing variations within areas of constant or slowly varying intensity image 40

TABLE I

| mask1 | mask2 | mask3 | mask4 |
|---|---|---|---|
| $\begin{bmatrix} 1 & 0 & -1 \\ 1 & 0 & -1 \\ 1 & 0 & -1 \end{bmatrix}$ | $\begin{bmatrix} -1 & 0 & 1 \\ -1 & 0 & 1 \\ -1 & 0 & 1 \end{bmatrix}$ | $\begin{bmatrix} 1 & 1 & 1 \\ 0 & 0 & 0 \\ -1 & -1 & -1 \end{bmatrix}$ | $\begin{bmatrix} -1 & -1 & -1 \\ 0 & 0 & 0 \\ 1 & 1 & 1 \end{bmatrix}$ |

The output of filter 22-1 is then applied to noise filter 24 which is preferably a conventional "blurring" filter to remove artifacts which might be interpreted as false edges. The output of noise filter 24 is then applied to threshold 26-1 to produce a binary second digital array. Threshold values of approximately 200 have provided satisfactory results where the pixel values of first digital array represented a 256-level greyscale.

Figure 5:
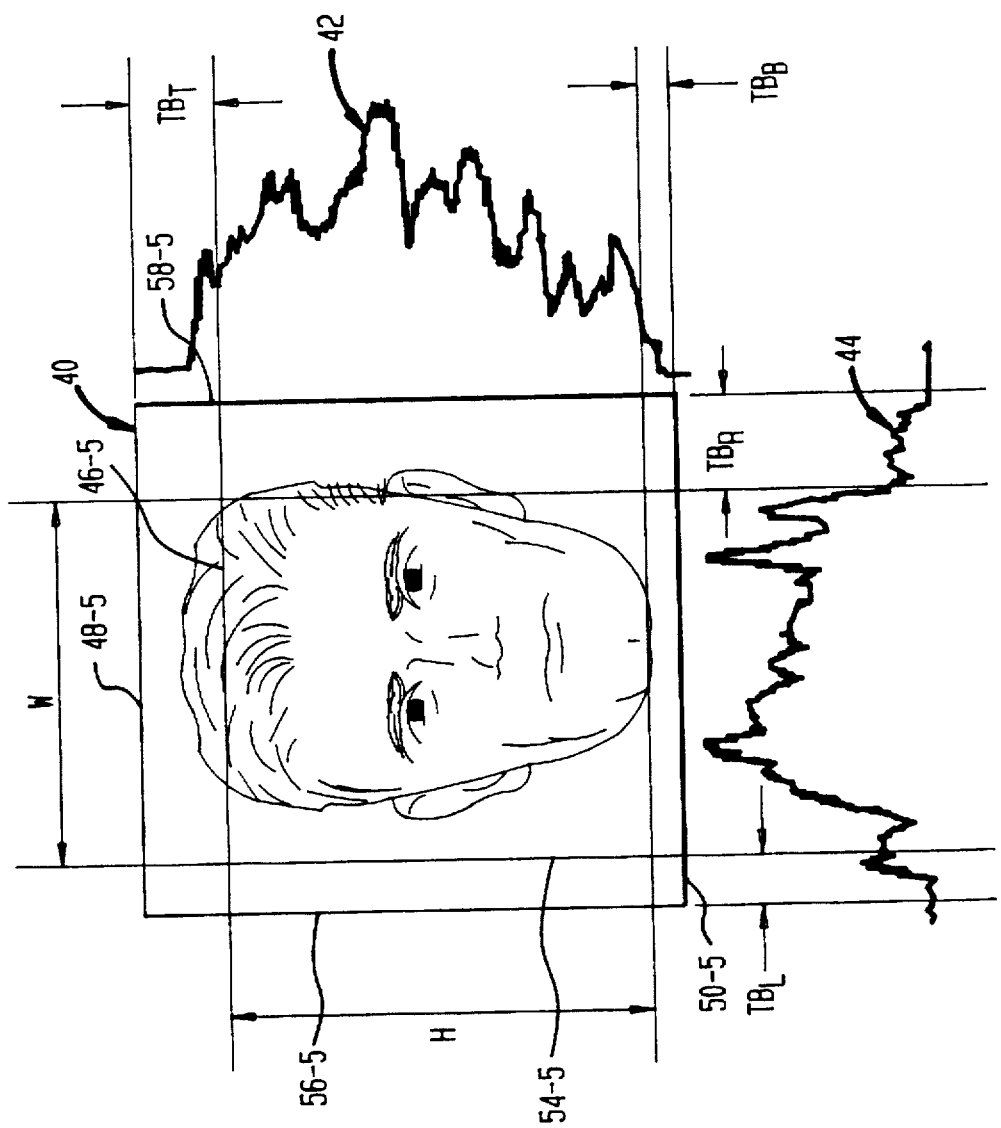
FIG. 5 is an illustration of another method of cropping an image in accordance with the subject invention.

Turning to FIG. 2 a first digital array is produced, and a second digital array is cropped and applied to the first digital array to produce cropped image CI in a manner substantially identical to that described with respect to FIG. 1 and apparatus 16-2 differs from apparatus 16-1 only in the manner in which the second digital array is generated. In apparatus 16-2 the first digital array is applied to non-linear edge enhancement filter 22-2 which sequentially convolves two 3×3 masks, shown in Table II below, with the first digital array. The absolute values of these convolution operations are then summed to provide the output of filter 22-2. In another embodiment of the subject invention the RMS value of the convolution operations may be taken as the output. Threshold 26-2 is then applied to the output of filter 22-2 to generate the second digital array. By using a non-linear filter concentrates brightness (i.e. asserted pixels) in areas of high detail, thus emphasizing face F and particularly high detail areas such as the eyes of face F. Pixel values are summed for the rows and columns of the second digital array to obtain brightness sums for image 40. Histogram 42 represents a plot of horizontal row brightness sums as a function of vertical position and histogram 44 represents a plot of vertical column brightness sums as a function of horizontal position. (Histograms shown in FIGS. 3 and 5 are intended as illustrative only and are not actually derived from the line drawing representations shown.)

In accordance with the embodiment of the subject invention illustrated in FIG. 3 the second digital array is first partitioned into two groups of horizontal rows of pixel values; a first, central, brighter group 46-3 and a second, less bright group consisting of upper border 48-3 and lower border 50-3 in accordance with criteria which require that first group 46-3 contain a predetermined fraction $TB_v$ of the total brightness of image 40 and that the remaining fraction of the total brightness be evenly divided between upper border 48-3 and lower border 50-3.

The columns of the second digital array are then divided into a third, central brighter group 54-3 and a forth, less bright group consisting of left border 56-3 and right border 58-3. The criteria for dividing the columns into groups are similar to the criteria applied to the rows with group 54-3 containing a predetermined fraction $TB_h$ of the total brightness of image 40 and borders 56-3 and 58-3 having the remaining total brightness evenly divided between them.

Once these groups are identified the borders between groups are applied to the first digital array by cropping element 32; which outputs only those pixel values of the first digital array which correspond to pixel values common to both central common brighter groups 46-3 and 54-3 to printer 18 to generate cropped image CI.

Values of 80% for $TB_v$ and $TB_h$ have been found to provide substantial reduction in the number of pixels required to represent cropped image CI while still retaining sufficient detail so that cropped image CI is easily recognizable.

Figure 4:
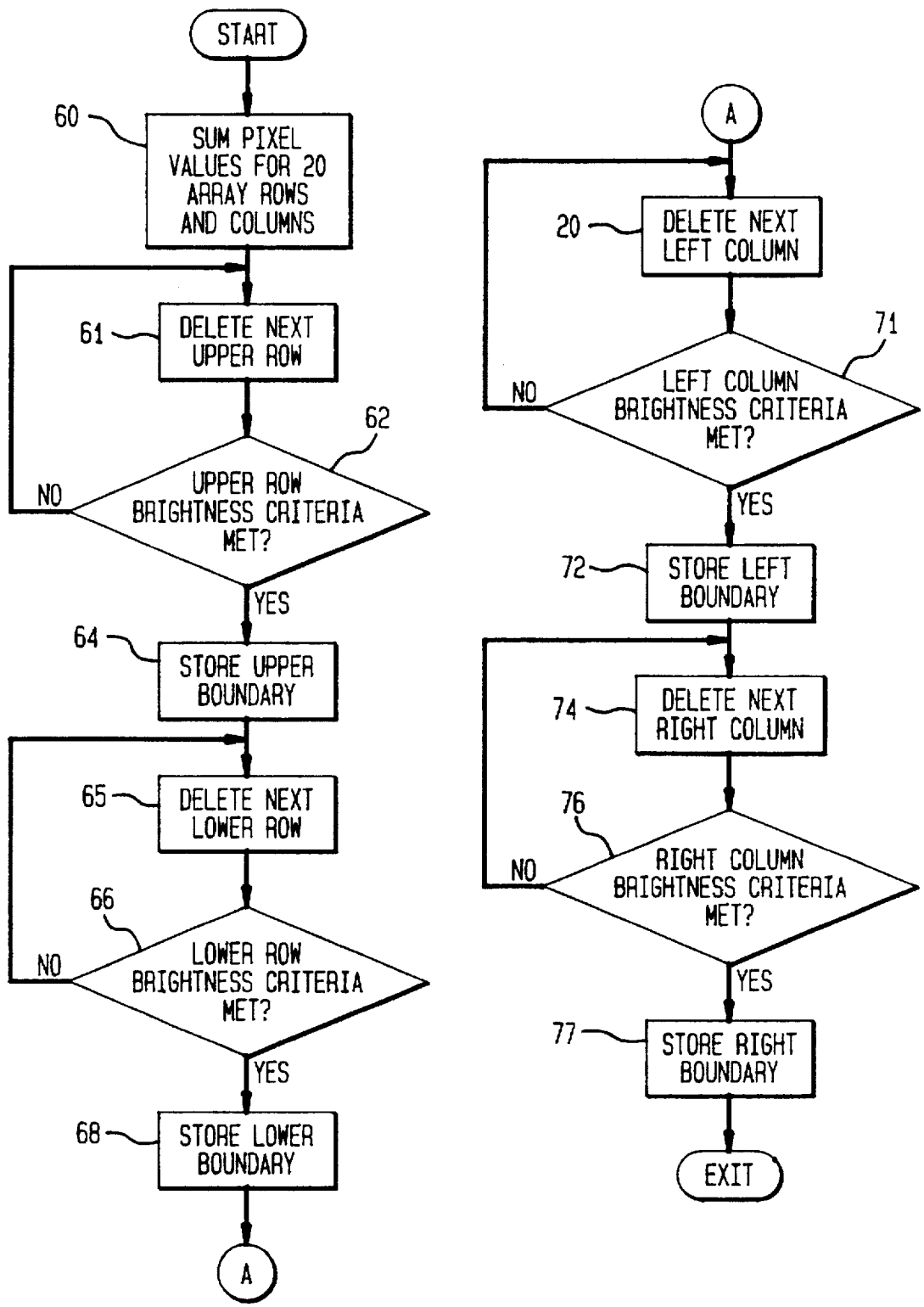
FIG. 4 is a flow diagram of the method of FIG. 3.

FIG. 4 shows a flow diagram of the operation of cropping element 30 in implementing the embodiment described above with respect to FIG. 3. At 60 element 30 sums pixel values for the second array rows and columns to generate row and column brightness sums. Then at 61 the next (i.e. outer most remaining) upper row is deleted and at 62 element 30 tests to determine if the upper row brightness criteria have been meet; that is, for the preferred embodiment described above, has approximately 10% of the total brightness been deleted. If the criteria has not been meet element 30 returns to 61 to delete the next upper row, and, if the criteria has been met, at 64 stores the upper border between group 46-3 and upper border 48-3. Then at step 65, 66 and 68 the lower boundary between border 50-3 and central group 46-3 is determined and stored in the same manner. Then at step 70, 71 and 72; and at steps 74, 76, and 77 the columns of the second digital array are divided into central group 54-3 and borders 56-3 in the same manner. Then, as described above identified boundaries are applied to the first digital array to generate cropped image CI.

(Those skilled in the art will recognize that, since only whole rows or columns can be deleted the above described brightness criteria (and those described below with respect to FIGS. 5 and 6) will, in general, only be met approximately.)

In other embodiments of the subject invention values for fractions $TB_v$ and $TB_h$ can be unequal and the total brightness in boundaries 48-3 and 50-3, and 56-3 and 58-3 need not be equal. In embodiments where face F is symmetrically positioned central groups 46-3 and 54-3 may simply be positioned symmetrically about the horizontal and vertical axes of image 40 by deleting the outermost pairs of rows or columns until the predetermined fraction of the total image brightness is left.

FIG. 5 shows an illustration of an other embodiment of the invention wherein cropping element 30 operates on the second digital array to divide the rows into a first, central, brighter group 46-5 having a predetermined height H and a second, less bright group consisting of upper border 48-5 and lower border 50-5; and to divide the columns into a third, central, brighter group 54-5 having a predetermined width W; and a fourth less bright group consisting of left border 56-6 and right border 58-5.

Figure 6:
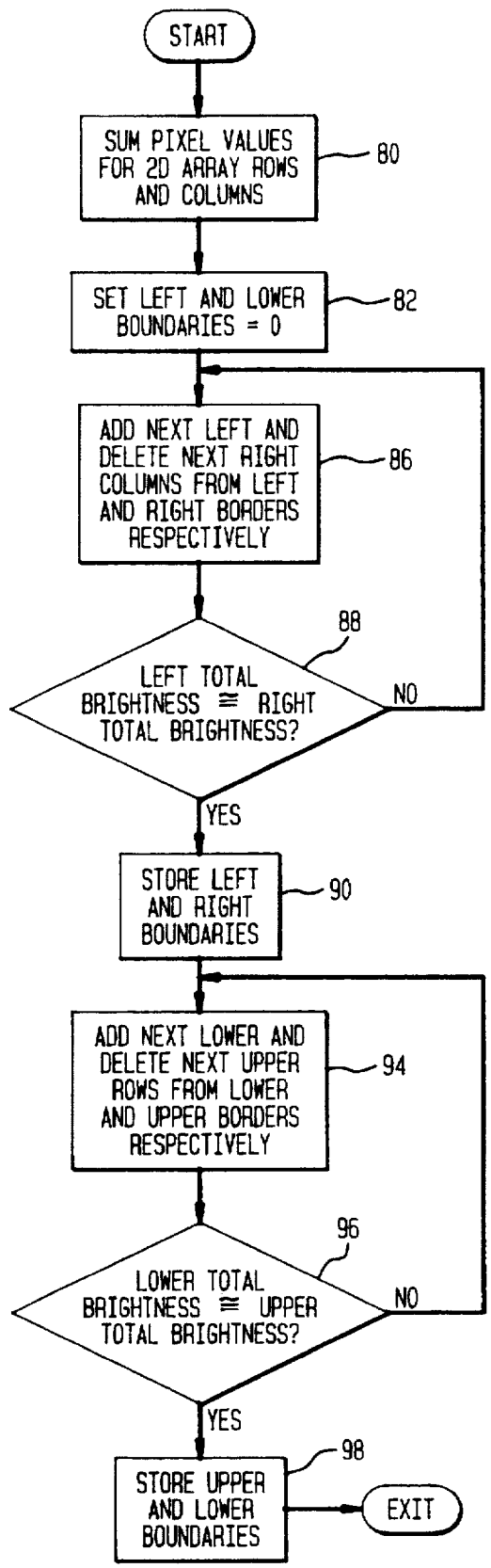
FIG. 6 is a flow diagram of the method of FIG. 5.

FIG. 6 shows a flow diagram of the operation of cropping element 30 on the second digital array in the embodiment described with respect to FIG. 5. At 80 element 30 sums the pixel values for the second digital array rows and columns. Then at 82 the left end lower borders are set equal to zero. That is group 46-5 is initially assumed to begin at the left edge of image 40 and group 54-5 is initially assumed to begin at the lower edge of image 40. Then at 86 the next (i.e. outermost) column is added to the left border and the next (i.e. innermost) column is deleted from the right border; and at 88 element 30 tests to determine if the left border total brightness equals the right border total brightness as closely as possible. If not element 30 returns to 86 to delete and add the next pair of columns; and, if the total brightness of the left and right borders are equal, stores the left and right boundaries between groups 54-3 and borders 56-3 and 58-3 at step 90. Then at steps 94, 96, and 98 element 30 operates on the rows of the second digital array to divide the pixel values into groups corresponding to groups 46-3 and border 48-3 and 50-3 in the same manner.

In other embodiments of the subject invention the boundaries between the central and border groups of the rows and columns may be taken at the outermost peaks of histograms 42 and 44 respectively and still other embodiments of the subject invention the second digital array may be partitioned into segments other than rows and columns. For example, the segments may be taken as concentric, and annular rings of approximately equal area and the image may be cropped radially.

EXAMPLE

TABLE III

Pixel Area Reduction: (Area measured in pixels$^2$)

|  | Original Area | Manual Crop 12 pixels/side | | Auto-Cropped (90%) | | Auto-Cropped (85%) | | Auto-Cropped (80%) | |
|---|---|---|---|---|---|---|---|---|---|
|  |  | Area | % of Original | Area | % of Original | Area | % of Original | Area | % of Original |
| Albert | 32279 | 24215 | 75.02% | 16256 | 50.36% | 13221 | 40.96% | 10816 | 33.51% |
| Eric | 32279 | 24215 | 75.02% | 18445 | 57.14% | 15038 | 48.59% | 13066 | 40.48% |
| GeorgeH | 32279 | 24215 | 75.02% | 23760 | 73.61% | 20808 | 64.46% | 15960 | 49.44% |
| James | 32279 | 24215 | 75.02% | 19398 | 60.09% | 16872 | 52.27% | 15080 | 46.72% |
| Lady | 22879 | 16159 | 70.63% | 15729 | 68.75% | 13700 | 59.88% | 11500 | 50.26% |
| Mayur | 32279 | 24215 | 75.02% | 19602 | 60.73% | 16912 | 52.39% | 14214 | 44.03% |
| Steve | 32279 | 24215 | 75.02% | 18207 | 56.41% | 15194 | 47.07% | 12544 | 38.86% |
| Theresa | 32279 | 24215 | 75.02% | 18048 | 49.72% | 12669 | 39.25% | 9890 | 30.64% |
| Averages: |  |  |  |  | 59.60% |  | 50.36% |  | 41.74% |

TABLE IV

| Compressed File Reduction: (Tested using JPEG with Q factor = 60) | | | | | | | | |
|---|---|---|---|---|---|---|---|---|
| | Original bytes | Manual Crop 12 pixels/side | | Auto-Cropped (90%) | | Auto-Cropped (85%) | | Auto-Cropped (80%) | |
| | | bytes | % of Original | bytes | % of Original | bytes | % of Original | bytes | % of Original |
| Albert | 1262 | 1004 | 79.56% | 833 | 66.01% | 753 | 59.67% | 691 | 54.75% |
| Eric | 992 | 742 | 74.80% | 635 | 64.01% | 573 | 57.76% | 440 | 44.35% |
| GeorgeH | 1130 | 893 | 79.03% | 889 | 78.67% | 799 | 70.71% | 599 | 53.01% |
| James | 1233 | 831 | 67.40% | 723 | 58.64% | 641 | 51.99% | 642 | 52.07% |
| Lady | 767 | 539 | 70.27% | 609 | 79.40% | 542 | 70.66% | 423 | 55.15% |
| Mayur | 1107 | 843 | 76.15% | 794 | 71.73% | 639 | 57.72% | 550 | 49.68% |
| Steve | 1196 | 896 | 74.92% | 779 | 65.13% | 631 | 52.76% | 477 | 39.88% |
| Teresa | 937 | 721 | 76.95% | 590 | 62.79% | 493 | 52.61% | 433 | 46.21% |
| Averages: | | | 74.88% | | 68.32% | | 59.24% | | 49.39% |

Table III shows examples of the subject invention where subject's faces were scanned to generate a first, 169×191, 256 greyscale level array of pixel values. The first array was operated on by a four mask linear filter and a conventional noise filter as described above, and a threshold of 200 applied to generate a second, binary array. The second array was then cropped to central groups of rows and columns having the various percentages of to total brightness shown. For each percentage of total brightness the percentage of pixels in the cropped image (i.e. pixels common to the two central groups) is given. A predetermined fixed cropping of 12 pixels/side is also shown for purposes of comparison Table IV shows the same percentages where the images are also compressed using the well known JPEG compression algorithm; demonstrating substantial benefits even with compression of the images.

The embodiments of the subject invention described above have been given by way of illustration only, and those skilled in the art will recognize numerous other embodiments of the subject invention from the detailed descriptions set forth above and the attached drawings. Accordingly, limitations on the subject invention are found only in the claims set forth below.

What is claimed:

1. A method of cropping an image, said image being represented as a first digital array of pixel values, said method comprising the steps of:
   a) processing said first digital array to produce a second digital array of pixel values, said processing including applying an edge enhancement transformation to said first digital array;
   b) partitioning said second digital array into predetermined segments;
   c) summing pixel values for each of said segments to obtain a brightness sum for each of said segments;
   d) dividing said segments into first and second groups in accordance with predetermined criteria relating to said brightness sums;
   e) identifying a group of said first digital array corresponding to said first group of said second digital array;
   f) outputting at least a part of said group of said first digital array to generate a cropped image.

2. A method as described in claim 1 wherein said processing further includes applying a threshold to each value output by said edge enhancement transformation whereby said second digital array is an array of binary pixel values.

3. A method as described in claim 2 wherein said edge enhancement transformation comprises applying a non-linear edge enhancement filter to said first digital array.

4. A method as described in claim 3 wherein said image includes a substantially featureless background and said threshold is selected as a function of said background.

5. A method as described in claim 2 wherein said edge enhancement transformation comprises applying a linear edge enhancement filter to said first digital array and then applying a noise filter to output of said linear edge enhancement filter.

6. A method as described in claim 1 wherein said segments are horizontal rows or vertical columns of said second digital array.

7. A method as described in claim 6 wherein said first group of segments is a contiguous group of said rows or of said columns containing a predetermined fraction of the total brightness of said second digital array.

8. A method as described in claim 7 wherein said predetermined fraction is approximately equal to 80 percent.

9. A method as described in claim 6 wherein said second group of segments consists of two contiguous borders outboard of said rows or columns, said borders having equal brightness.

10. A method of cropping an image, said image being represented as a first digital array of pixel values, said method comprising the steps of:
   a) processing said first digital array to produce a second digital array of pixel values, said processing including applying an edge enhancement transformation to said first digital array;
   b) partitioning said second digital array into predetermined horizontal rows of pixel values;
   c) summing pixel values for each of said horizontal rows to obtain brightness sums for each of said rows;
   d) dividing said rows into first and second groups in accordance with predetermined criteria relating to said horizontal row brightness sums;
   e) partitioning said second digital array into predetermined vertical columns;
   f) summing pixel values for each of said vertical columns to obtain brightness sums for each of said columns;
   g) dividing said columns into third and fourth groups in accordance with predetermined criteria relating to said column brightness sums;
   h) identifying a part of said first digital array corresponding to pixels common to said first and third groups of said second digital array;

i) outputting said part of said first digital array to generate a cropped image.

11. A method as described in claim 10 wherein said processing further includes applying a threshold to each value output by said edge enhancement transformation whereby said second digital array is an array of binary pixel values.

12. A method as described in claim 11 wherein said edge enhancement transformation comprises applying a non-linear edge enhancement filter to said first digital array.

13. A method as described in claim 12 wherein said image includes a substantially featureless background and said threshold is selected as a function of said background.

14. A method as described in claim 11 wherein said edge enhancement transformation comprises applying a linear edge enhancement filter to said first digital array and then applying a noise filter to output of said linear edge enhancement filter.

15. A method as described in claim 1 wherein said image is an image of a human face.

16. An apparatus for cropping an image, said image being represented as a first digital array of pixel values, said apparatus comprising:

a) means for processing said first digital array to produce a second digital array of pixel values, said processing including applying an edge enhancement transformation to said first digital array;

b) means for cropping said second digital array to form first and second groups of predetermined segments of said second digital array in accordance with predetermined criteria relating to brightness of said segments;

c) means for identifying a group of said first digital array corresponding to said first group of said second digital array;

d) means for outputting at least a part of said group of said first digital array to generate a cropped image.

* * * * *